US012066846B2

(12) United States Patent
Rutherford et al.

(10) Patent No.: US 12,066,846 B2
(45) Date of Patent: Aug. 20, 2024

(54) DEVICE ENCLOSURE TEMPERATURE CONTROL

(71) Applicant: NCR Atleos Corporation, Atlanta, GA (US)

(72) Inventors: Paul David Rutherford, Dundee (GB); Adam Delaney Boyd, Fife (GB); Donald Iain MacInnes, Angus (GB); He Ren, Beijing (CN)

(73) Assignee: NCR Atleos Corporation, Atlanta, GA (US)

( * ) Notice: Subject to any disclaimer, the term of this patent is extended or adjusted under 35 U.S.C. 154(b) by 76 days.

(21) Appl. No.: 17/956,016

(22) Filed: Sep. 29, 2022

(65) Prior Publication Data

US 2024/0111318 A1    Apr. 4, 2024

(51) Int. Cl.
*G05D 23/19*        (2006.01)
*G07D 11/235*        (2019.01)
*H02P 29/62*        (2016.01)

(52) U.S. Cl.
CPC ..... *G05D 23/1934* (2013.01); *G05D 23/1917* (2013.01); *G07D 11/235* (2019.01); *H02P 29/62* (2016.02); *H05B 2203/005* (2013.01)

(58) Field of Classification Search
CPC ............ G05D 23/1934; G05D 23/1917; H02P 29/62; G07D 11/235; H05B 2203/005
See application file for complete search history.

(56) References Cited

U.S. PATENT DOCUMENTS 10,310,655 B1 *   6/2019   Edwards ............... G06F 3/0412

* cited by examiner

*Primary Examiner* — Zoheb S Imtiaz
(74) *Attorney, Agent, or Firm* — Schwegman Lundberg & Woessner, P.A.

(57) ABSTRACT

Current temperatures for an enclosure of a media handling device are monitored and managed using threshold temperature values. When a current temperature deviates below a threshold temperature value, commands are sent to modules of the device to start and idle their motors causing heat to be generated from current flowing to the motors. The heat radiates within the enclosure raising the current temperature. When the current temperature reaches a second threshold temperature value for the enclosure, second commands are sent to the modules of the device to stop idling their motors causing heat within the enclosure to dissipate and lowering the current temperature for the enclosure.

20 Claims, 3 Drawing Sheets

DEVICE ENCLOSURE TEMPERATURE CONTROL

BACKGROUND

Most components and modules within a transaction terminal require a minimum operating temperature for safe and proper functioning. This is particularly true of automated teller machines (ATM) which often are available to consumers in remote outdoor locations for walk-up or drive-up access. These outdoor ATMs can be located in inhospitable geographic locations that can be subject to extreme temperatures during winter. This is problematic for many electromechanical components of the ATM, such as dispensers and recyclers where the minimum operating temperature is typically 10 degrees Celsius or 50 degrees Fahrenheit.

When ambient conditions fall below the threshold values for the components of the ATM, the modules can lose functionality. For example, currency suction cups harden, mechanisms become stiff, etc. Currently, ATMs attempt to manage internal enclosure temperatures using a single source of external heat which typically encounters trouble in maintaining a uniform temperature across the internal modules.

To alleviate temperature control issues, some ATMs also incorporate resistive heating elements within their enclosures to maintain a safe operating temperature for the ATMs. This adds additional cost beyond the single source of heat and takes up space within the enclosure'; space within the enclosure is already almost 100% occupied such that adding these resistive heating elements is challenging to say the least.

The single source of external heat is often simply a ceramic heater, which kicks on at a predefined temperature and runs until a desired temperature is detected. Power consumption to run these heaters and wide hysteresis due to lack of targeting of the heat from the heaters can cost a significant amount of money for an organization with thousands of ATMs.

Therefore, there is a need for more power efficient and internal enclosure temperature control mechanisms for terminals and their modules subjected to ambient outdoor temperatures.

SUMMARY

In various embodiments, a system, a media handling device peripheral, and a method for device enclosure temperature control are presented. Firmware of a media handling device associated with a transaction terminal monitors current temperatures being experienced within an enclosure of the media handling device. When the current temperature deviates below a first threshold temperature, the firmware sends commands to modules of the media handling device causing the modules to idle their motors or to lock their shafts. As current flows to the motors, heat radiates within the enclosure of the media handling device which raises the current temperature for the enclosure. When the current temperature rises above a second threshold temperature, the firmware sends commands to the modules causing the modules to stop idling their motors causing the heat within the disclosure to dissipate and lowering the current temperature for the enclosure. The firmware optimally manages the internal temperatures within the enclosure of the media handling device.

DETAILED DESCRIPTION

As stated above, the approach in the industry is to maintain internal enclosure temperatures of a media handling device using an external heat source and resistive heating elements inserted into the device's enclosure. This is power inefficient, lacks fine grain temperature control, and presents challenges for enclosures that have little to no available space for locating resistive heating elements.

The teachings provided herein provide power efficient and fine-grain control of internal temperatures within an enclosure of a media handling device to ensure that modules within the enclosure continue to operate properly even when ambient temperatures outside the media handling device fall below recommended operating temperatures for the modules. This is achieved without adding any additional hardware to the media handling device, without adding any heaters, and without adding any resistive heating elements. Each module within a media handling device includes it own motor to drive its electromechanical components during operation of a transaction terminal. During operation of the modules their motors generate heat from current running the coils to the motors and kinetic or magnetic motion generated by the motors. When the terminal is idle and the temperature within the media handing device's enclosure deviates below a minimum threshold temperature, a command is sent to the motors of the modules to idle by lock motor shafts in place while running current through to the motors. This generates thermal heat caused by the current and heats the enclosure of the media handling device, once the enclosure is above a threshold temperature a command is sent to the motors of the modules to stop idling. In this way, fine-grain temperature control is achieved within the enclosure without any additional hardware by using the existing hardware of the media handling device itself. Moreover, the power consumption needed for the current to the motors is substantially less than what is needed for a standalone heater and resistive heating elements. Therefore, this approach is energy efficient by consuming less power that does heaters and resistive heating elements; cost efficient by lowering unit cost with removal of heater and resistive heating elements; simplifies assembly of the enclosure of the media handling device, which now does not require the heater nor resistive heating elements; and decreases the physical footprint of the media handling device with smaller enclosures without the heater and without the resistive heating elements.

Figure 1:
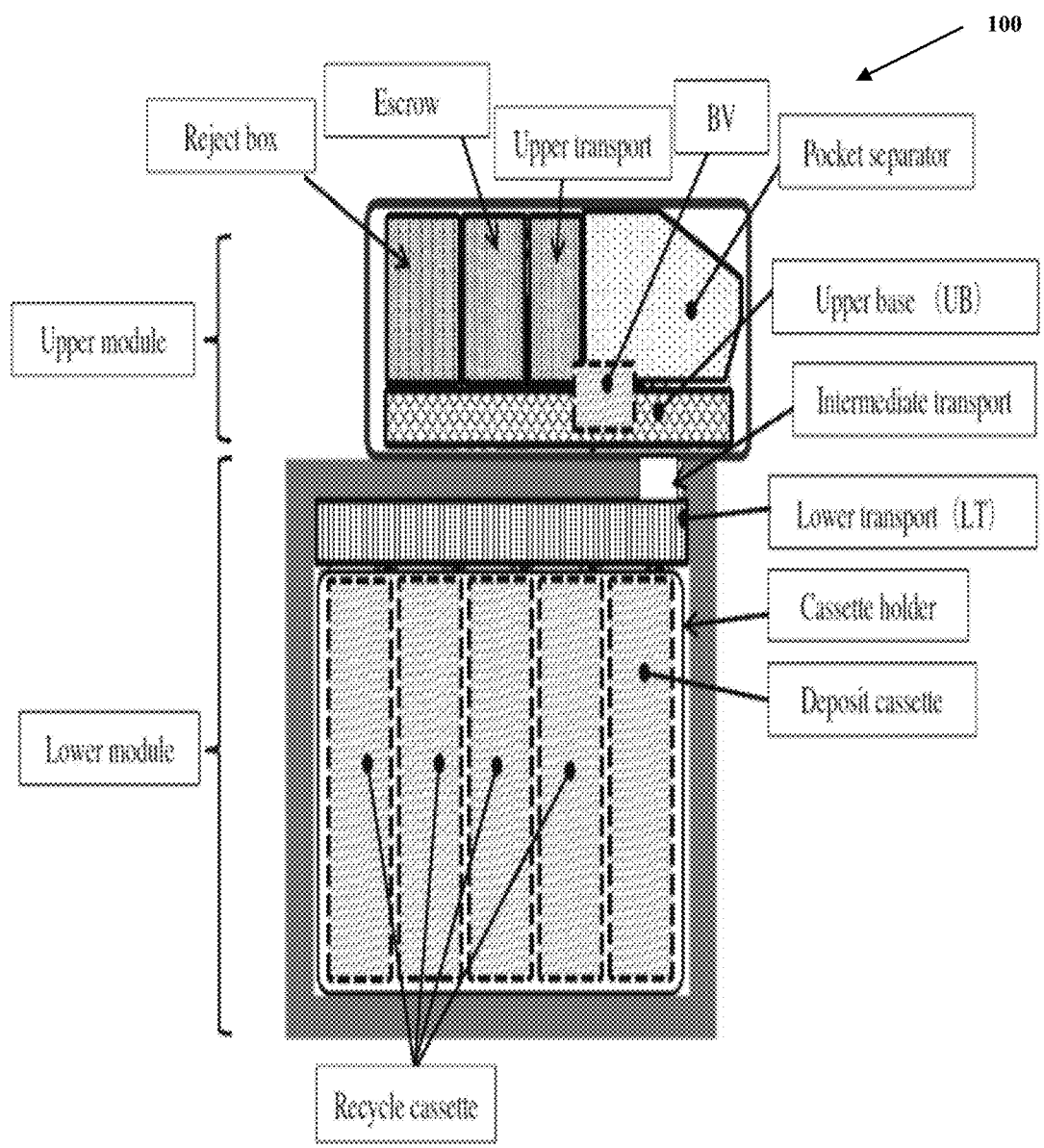
FIG. 1 is a diagram of a media handling device and corresponding modules with motors, according to an example embodiment.

FIG. 1 is a diagram of a media handling device 100 and corresponding modules with motors, according to an example embodiment. It is to be noted that the components are shown schematically in greatly simplified form, with only those components relevant to understanding of the embodiments being illustrated.

Media handing device 100 includes a variety of modules that include motors of various types, such as direct current (DC) motors, stepper motors, magnetic motors, etc. The modules that include the motors are illustrated in FIG. 1 and labeled as a reject box module, an escrow module, an upper transport module, a bill validator (BV) module, a pocket separator module an upper base module, an intermedia transport module, a lower transport module, a cassette holder module, a deposit cassette module, a recycle cassette module, a lower module and an upper module. It is note that other modules may be present as well such as an infeed module that comprises a shutter, a media deskew module, etc. The modules are electromechanical devices that include mechanical components and electrical components that control the mechanical components.

Each module may also include its own printed circuit board (PCB) which includes one or more processors that execute firmware instructions to cause or to urge the corresponding electromechanical components to perform operations. The media handling device 100 includes its own main PCB with its own processors that execute firmware instructions to send commands to and receive messages back from the modules for purposes of controlling the operation of the media handling device 100. Each module includes firmware instructions that permit that module to report its internal temperature in messages to the main PCB or in logs that can be monitored by the main PCB. Each module also includes firmware instructions to cause its motor to operate normally, idle, or shut down.

As used herein usage of the term "terminal" or the phrase "transaction terminal" is intended to include a media handling device 100 peripheral. The terminal may include other peripherals such as and by way of example only, a card reader, a contactless card reader, a touch display, a printer, a scanner, a coin deposit/dispense module, a shutter module, a check reader module, a bag weigh scale, a produce weigh scale, a personal identification number (PIN) pad, an encrypted PIN pad, a keypad, etc.

In an embodiment, the terminal can include an automated teller machine (ATM), a self-service terminal (SST) with the media handling device peripheral, a point-of-sale (POS) terminal with the media handling device peripheral, or a kiosk with the media handling device peripheral. In an embodiment, the media handling device peripheral can include a valuable media depository, a valuable media dispenser, and a valuable media recycler.

Figure 2:
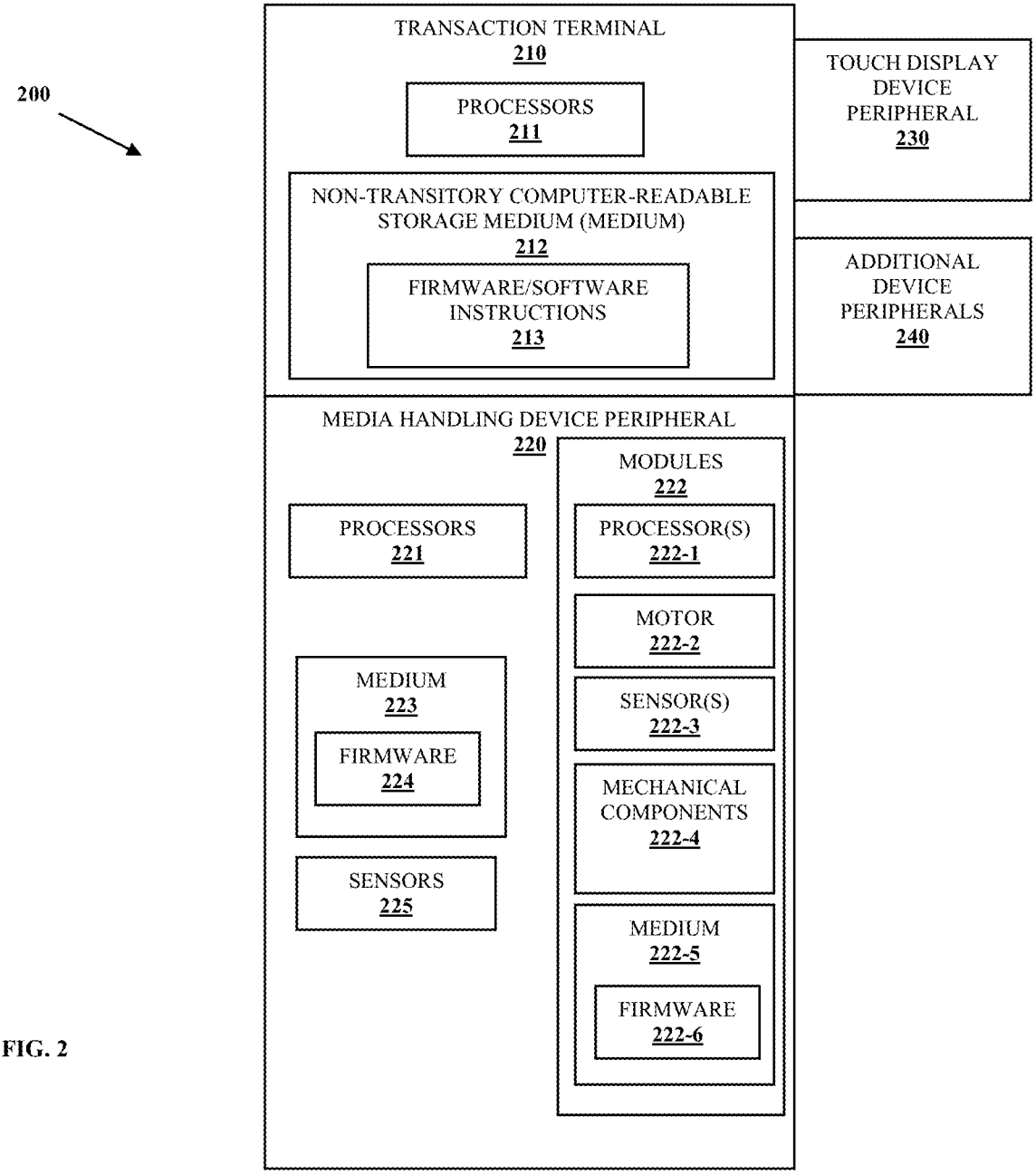
FIG. 2 is a diagram of a system for controlling internal enclosure temperatures for a media handling device, according to an example embodiment.

FIG. 2 is a diagram of a system 200, a terminal 210, and a media handling device peripheral 220 for controlling internal enclosure temperatures for a media handling device peripheral, according to an example embodiment. It is to be noted that the components are shown schematically in greatly simplified form, with only those components relevant to understanding of the embodiments being illustrated.

System 200 includes a transaction terminal 210, a media handling device peripheral 220 (hereinafter referred to as "media handing device 220"), a touch display device peripheral 230, and additional device peripherals 240. Terminal 210 includes one or more processors 211 and a non-transitory computer-readable storage medium 212 (hereinafter referred to as "medium"), which includes firmware and/or software executable instructions 213. The firmware/instructions 213 when provided to processor 211 from medium 212 cause the processor to perform operations associated with performing transactions, performing support functions, managing peripherals 220-240, and controlling peripherals 220-240.

Media handling device 220 includes one or more processors 221, modules 222, sensors 225, and medium 223, which includes firmware 224. The firmware 224 when provided to processor 221 from medium 223 causes processor 221 to perform operations associated with performing valuable media-based actions during a transaction on terminal 210, managing modules 222, controlling modules 222, monitoring internal temperatures associated with an enclosure that includes modules 222, monitoring internal temperatures of each modules' motor 222-2, and controlling modules 222 for idling, stopping, and/or engaging their motors 222-2.

Each module 222 includes one or more processors 222-1, a motor 222-2, one or more sensors 222-3, mechanical components 222-4, and medium 222-5, which includes firmware 222-6. The firmware 222-6 when provided to processor 222-2 causes processor 222-2 to perform operations associated with stopping motor 222-2, idling motor 222-2, engaging motor 222-2, and/or logging/reporting sensor values from sensor 222-3.

Firmware 224 uses a temperature gauge sensor 225 to monitor the internal temperature of the enclosure or housing associated with media handling device 220 and obtains temperature values directly from firmware 222-6 associated with the modules 222 or obtains the temperature values for modules 222 from log(s) written to by firmware 222-6.

Firmware 224 uses one or more preset and/or configurable threshold temperature values for the enclosure of media handling device 220 and each of the modules 222 to determine when to cause the motors 222-2 of modules 222 to idle and when to shut the motors 222-2 off. During idling of motors 222-2, current is flowing through coils associated with motors 222-2, this generates thermal heat within enclosures of modules 222 and radiates heat outside the enclosures of modules 222 into the overall enclosure of media handling device 220. This raises the ambient temperature inside of the enclosure for media handling device 220.

Firmware 224 also continuously monitors the temperate gauge sensor 225 using the threshold temperature values to determine when to issue or raise an event that causes a command to be provided to the modules' firmware 222-6 to stop their motors 222-2 from idling. Firmware 224 monitors temperature values reported or logged by each of the modules 222 from their corresponding sensors 222-3 and stops the idling of their motors 222-2 when the temperature values are approach maximum operating temperatures for the corresponding motors 222-2; the maximum operating temperatures defined for each motor 222-2 in the threshold temperature values.

The threshold temperature values can be defined within a file used by firmware 224 and can be changed as needed by editing the file. In an embodiment, one or more of the threshold temperature values are passed as processing parameters to firmware 224.

In an embodiment, the operations discussed above with respect to firmware 224 are processed instead by firmware 213 of terminal 210. That is, either firmware 224 or firmware 213 can manage and control the internal temperatures for the enclosure of the media handling device 220 by instructing firmware 222-6 of modules 222 to idle their motors 222-2 and to stop idling their motors 222-2.

In an embodiment, components of the media handling device 220, which are not associated with modules having motors, can be supplied current an/or instructed to perform non-destructive functions/operations by firmware 213 to cause operations/functions to be processed/performed that radiate additional thermal heat when heat is needed based on a current temperature of the enclosure of media handling device 220. For example, a nested loop set of instructions that perform no operations can be processed or a recursive loop of no operations can be processed for purposes of clocking or over clocking processors 211. When firmware 213 detects a transaction was initiated or detects that internal temperatures of processors 211 are running too hot, firmware 213 can kill the nested loop or recursive loop instructions. As another example, any insulated-gate bipolar transistors (IGBTs) within media handling device 220 that are used to invert power between direct current (DC) and alternating current (AC) can be driven current for inversion by firmware 213 to generate additional thermal heat within the enclosure. So, non-motor-based components and/or solid-state components can be controlled by firmware 213 to essentially idle and/or perform functions or non-destructive operations that generate thermal heat within the enclosure System 200, terminal 210, and media handling device 220 can perform temperature management for an enclosure of the media handling device 220 without any additional hardware modules. Firmware 212 and/or 224 can be upgraded or updated to include the enclosure temperature management utilizing the existing hardware for modules 222 and their corresponding motors 222-2 to increase heat through thermal heat that radiates within the enclosure when the motors 222-2 are idling and to decrease heat when the idling is stopped, and the heat dissipates within the disclosure.

Figure 3:
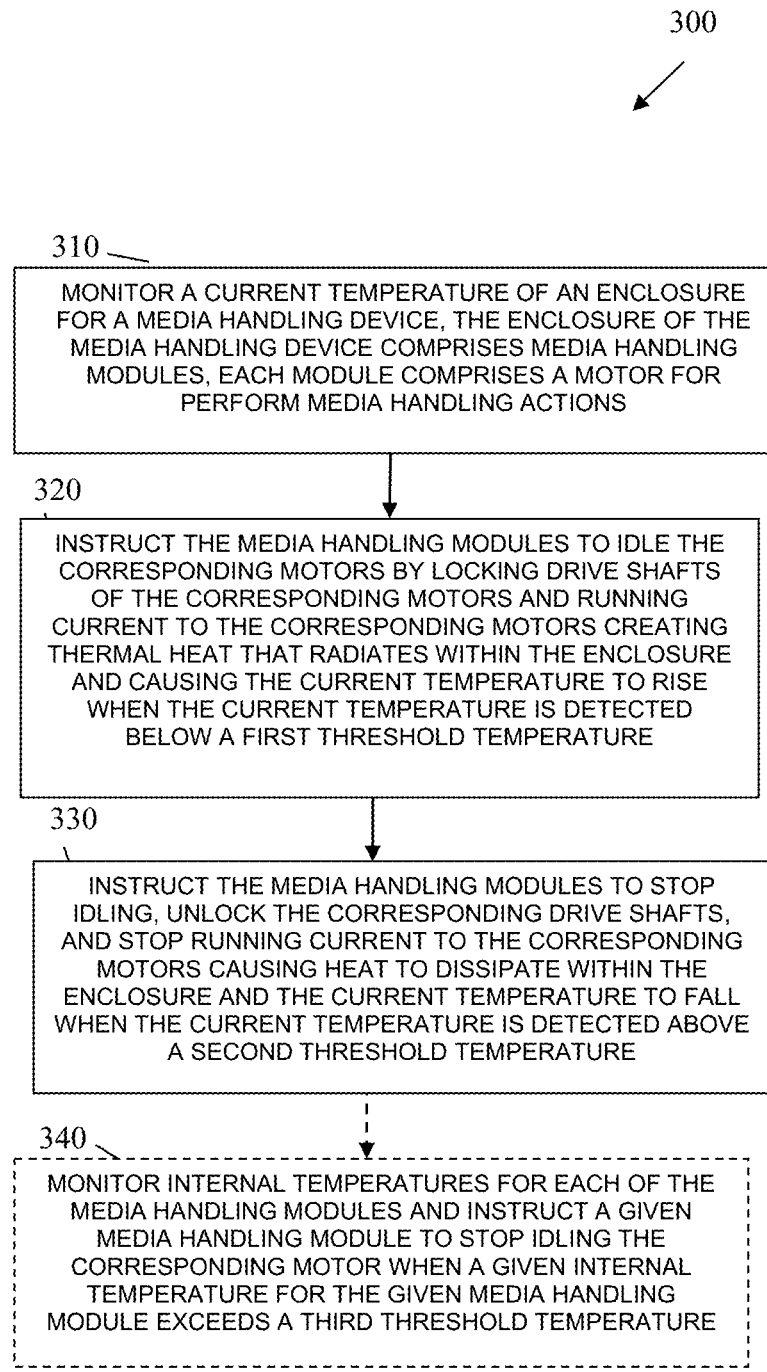
FIG. 3 is a flow diagram of a method for controlling internal enclosure temperatures of a media handling device, according to an example embodiment.

FIG. 3 is a flow diagram of a method 300 for controlling internal enclosure temperatures of a media handling device, according to an example embodiment. The software module(s) that implements the method 300 is referred to as "firmware." The firmware is implemented as executable instructions programmed and residing within memory and/or a non-transitory computer-readable (processor-readable) storage medium and executed by one or more processors of one or more devices. The processor(s) of the device(s) that executes the firmware are specifically configured and programmed to process the firmware. The firmware may have access to one or more network connections during its processing or the firmware does not have access nor need any network connection during its processing. Any network connection when available to the firmware can be wired, wireless, or a combination of wired and wireless.

In an embodiment, the device that executes the firmware is media handling device 220. In an embodiment, the device that executes the firmware is terminal 210. In an embodiment, the firmware presents another and, in some ways, an enhanced processing perspective from that which was described above for firmware 220 of system 200.

At 310, the firmware monitors a current reported temperature of an enclosure for a media handling device 220 using a temperature gauge or temperature sensor 225. The enclosure of the media handling device includes media handing modules 222. Each module 222 includes a motor 222-2 for performing media handling actions. The modules 222 can include any of the modules listed above with the discussion of FIG. 1.

At 320, the firmware instructs the media handling modules 222 to idle their corresponding motors 222-2 by locking the motor drive shafts and running/passing current to the motors 222-2. This creates thermal heat that radiates when the enclosure and causes the current temperature to rise. The firmware instructs the motors 222-2 to idle when the current temperature is detected as being below a first threshold temperature.

At 330, the firmware instructs the media handling modules 222 to stop idling, unlock the corresponding drive shafts, and stop running current to the corresponding motors 222-2. This causes heat to dissipate within the enclosure and the current temperature to fall. The firmware instructs the motors 222-2 to stop idling when the current temperature is detected as being above a second threshold temperature.

In an embodiment, at 340, the firmware monitors internal temperatures for each of the media handling modules 222 and instructs a given media handling module 222 to stop idling the corresponding motor 222-2 when a given internal temperature for the given media handling module 222 exceeds a third threshold temperature. This is an indication that the given module's motor 222-2 is operating at too high of a temperature and needs to be shut down to avoid damage to the motor 222-2.

It should be appreciated that where firmware/software is described in a particular form (such as a component or module) this is merely to aid understanding and is not intended to limit how firmware/software that implements those functions may be architected or structured. For example, modules are illustrated as separate modules, but may be implemented as homogenous code, as individual components, some, but not all of these modules may be combined, or the functions may be implemented in firmware/software structured in any other convenient manner.

Furthermore, although the firmware/software modules are illustrated as executing on one piece of hardware, the firmware/software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A media handling device, comprising:
media handling modules, each media handling module comprises a motor and mechanical components for handling media being processed within the media handling device;
a temperature sensor;
a processor
a non-transitory computer-readable storage medium that comprises firmware instructions; and
the firmware instructions obtained by the processor from the non-transitory computer-readable storage medium causing the processor to perform operations comprising:
instructing the media handling modules to idle and stop idling the corresponding motors to control and to manage a current temperature being experienced within an enclosure of the media handling device using the temperature sensor;
wherein when the motors are idling current flowing to the motors causes heat to radiate within the enclosure to raise the current temperature
wherein when the motors stop idling heat dissipates within the enclosure to lower the current temperature.

2. The media handling device of claim 1, wherein the media handling modules include one or more of a reject box module, an escrow module, an upper transport module, a bill validator module, a pocket separator module, an upper base module, an intermediate transport module, a lower transport module, a cassette holder module, a deposit cassette module, a recycle cassette module, a lower module, an upper module, a shutter module, a coin deposit/dispense module, and a check reader module.

3. The media handling device of claim 1, wherein the media handling device is a valuable media depository, a valuable media dispenser, or a valuable media recycler.

4. The media handling device of claim 1, wherein each of the media handling modules further includes a module temperature sensor to report internal temperatures of the corresponding media handling module.

5. The media handling device of claim 4, wherein the operations further include:
instructing a specific media handling module to stop idling the corresponding motor when the corresponding current internal temperature for the specific media handling module exceeds a threshold temperature.

6. The media handling device of claim 1, wherein the operations associated with the instructing further include:
instructing the media handling modules to idle the corresponding motors when the current temperature deviates below a first threshold temperature.

7. The media handling device of claim 6, wherein operations associated with the instructing further include:
instructing the media handling modules to lock drive shafts of the corresponding motors while driving current through the corresponding motors to generate thermal heat during the idling as opposed to kinetic heat generated when the drive shafts are unlocked.

8. The media handling device of claim 7, wherein operations associated with the instructing further include:
instructing the media handling modules to stop idling and unlock the drive shafts by stopping current being driven to the corresponding motors when the current temperature rises above a second threshold temperature.

9. The media handling device of claim 1, wherein operations associated with the instructing further include:
comparing the current temperature against threshold temperatures to determine when to instruct the media handling modules to idle the corresponding motors and to determine when to instruct the media handling modules to stop idling the corresponding motors.

10. The media handling device of claim 9, wherein operations associated with the instructing further include:
obtaining the threshold temperatures from a file or from parameters passed to the firmware instructions.

11. A system, comprising:
a transaction terminal;
a media handling device interfaced to the transaction terminal; and
a temperature sensor located within an enclosure of the media handling device;
wherein the system monitors a current temperature reported by the temperature sensor to idle motors associated with media handling modules of the media handling device when the current temperature is to be increased through thermal heat that radiates within the enclosure from current flowing to the motors as the motors idle;
wherein the system monitors the current temperature reported by the temperature sensor to stop idling the motors associated with the media handling modules when the current temperature is to be decreased by removing the current flowing to the motors to stop powering the motors.

12. The system of claim 11, wherein the transaction terminal further includes a processor, and wherein the processor monitors the current temperature and instructs the media handling device to cause the motors of the media handling modules to idle and to stop idling based on the current temperature and threshold temperatures.

13. The system of claim 11, wherein the media handling device includes a processor, and wherein the processor monitors the current temperature and instructs the media handling modules to idle and to stop the idling of the motors based on the current temperature and threshold temperatures.

14. The system of claim 11, wherein the system further monitors internal temperatures reported for the media handling modules and stops idling a given motor when a given internal temperature reaches a threshold operating temperature.

15. The system of claim 14 wherein the transaction terminal further includes a processor, and wherein the processor monitors the internal temperatures and instructs the media handling device to cause the given motor to stop idling when the given internal temperature reaches the threshold operating temperature.

16. The system of claim 14, wherein the media handling device includes a processor, and wherein the processor monitors the internal temperatures and instructs a given media handling module associated with the given motor to stop the idling of the given motor when the given temperature reaches the threshold operating temperature.

17. The system of claim 11, wherein the media handling modules include modules associated with depositing currency notes, coins, and checks, and wherein the media handling modules further include additional modules associated with depositing checks.

18. The system of claim 11, wherein the transaction terminal is an automated teller machine, a self-service terminal, a point-of-sale terminal, or a kiosk, and wherein the media handling device is a valuable media depository, a valuable media dispenser, or a valuable media recycler.

19. A method, comprising:
monitoring a current temperature of an enclosure for a media handling device, wherein the enclosure of the media handling device comprises media handling modules, each module comprises a motor for performing media handling actions;
instructing the media handling modules to idle the corresponding motors by locking drive shafts of the corresponding motors and running current to the corresponding motors creating thermal heat that radiates within the enclosure and causing the current temperature to rise when the current temperature is detected below a first threshold temperature; and
instructing the media handling modules to stop idling, unlock the corresponding drive shafts, and stop running current to the corresponding motors causing heat to dissipate within the enclosure and the current temperature to fall when the current temperature is detected above a second threshold temperature.

20. The method of claim 19 further comprising:
monitoring internal temperatures for each of the media handing modules and instructing a given media handling module to stop idling the corresponding motor when a given internal temperature for the given media handling module exceeds a third threshold temperature.

* * * * *